US012201583B2

(12) United States Patent
Mayne et al.

(10) Patent No.: US 12,201,583 B2
(45) Date of Patent: Jan. 21, 2025

(54) PHARMACEUTICAL DOSAGE SYSTEM

(71) Applicant: Vanda Pharmaceuticals Inc., Washington, DC (US)

(72) Inventors: Andrew Mayne, Allschwill (CH); Petra Lutz, Allschwill (CH); Paromita Sarkar, Bloomfield, NJ (US); Galina Gouvea, New York, NY (US)

(73) Assignee: Vanda Pharmaceuticals Inc., Washington, DC (US)

( * ) Notice: Subject to any disclaimer, the term of this patent is extended or adjusted under 35 U.S.C. 154(b) by 108 days.

(21) Appl. No.: 17/697,007

(22) Filed: Mar. 17, 2022

(65) Prior Publication Data

US 2022/0296468 A1 Sep. 22, 2022

Related U.S. Application Data

(60) Provisional application No. 63/162,505, filed on Mar. 17, 2021.

(51) Int. Cl.

*A61J 1/03* (2023.01)
*A61J 7/04* (2006.01)
*B65D 75/32* (2006.01)
*B65D 83/04* (2006.01)

(52) U.S. Cl.

CPC ............. *A61J 1/035* (2013.01); *A61J 7/0481* (2013.01); *B65D 75/327* (2013.01); *B65D 83/0463* (2013.01)

(58) Field of Classification Search

CPC ... A61J 7/04; A61J 7/081; A61J 1/035; B65D 83/0463; B65D 75/327
USPC .................................................. 206/528–540
See application file for complete search history.

(56) References Cited

U.S. PATENT DOCUMENTS

| | | | | | |
|---|---|---|---|---|---|
| 4,553,670 | A * | 11/1985 | Collens | A61J 1/035 | 206/534 |
| 4,736,849 | A * | 4/1988 | Leonard | B65D 83/04 | 206/534 |
| D370,625 | S * | 6/1996 | Kelsey | 206/534 | |
| 5,788,974 | A * | 8/1998 | D'Amico | A61K 45/06 | 424/464 |
| 6,041,932 | A * | 3/2000 | Holmberg | A61J 7/04 | 206/534 |
| 6,161,699 | A * | 12/2000 | Gartland | B65D 75/327 | 206/532 |
| 6,375,956 | B1 * | 4/2002 | Hermelin | A61J 7/04 | 424/464 |
| 6,564,945 | B1 * | 5/2003 | Weinstein | A61J 1/03 | 206/459.5 |
| 7,086,532 | B2 * | 8/2006 | Zanden | A61J 1/035 | 206/532 |
| 7,556,150 | B2 * | 7/2009 | Reape | A61K 31/519 | 206/534 |
| 7,696,236 | B2 * | 4/2010 | Bradford | A61K 31/4418 | 514/350 |

(Continued)

*Primary Examiner* — Chun Hoi Cheung
(74) *Attorney, Agent, or Firm* — Hoffman Warnick LLC

(57) ABSTRACT

A pharmaceutical dosage system includes a blister pack and a plurality of dosage forms contained by the blister pack. The dosage forms are to be consumed in an up-titration process. Only one single dosage form of the plurality of dosage forms is consumed on a given day throughout the up-titration process whereby dosages increase over the course of a multi-day period of time.

12 Claims, 6 Drawing Sheets

(56) References Cited

U.S. PATENT DOCUMENTS

| | | | | |
|---|---|---|---|---|
| 8,747,844 | B2 * | 6/2014 | Salvemini | A61P 25/04 514/408 |
| 9,408,777 | B2 * | 8/2016 | Choubey | B65D 75/327 |
| 10,278,969 | B2 * | 5/2019 | Ribeiro | A61K 31/506 |
| 2002/0162769 | A1 * | 11/2002 | Weinstein | A61K 45/06 206/534 |
| 2007/0227931 | A1 * | 10/2007 | Shane | A61J 1/035 206/472 |
| 2012/0228190 | A1 * | 9/2012 | Yun | A23L 33/10 206/570 |

* cited by examiner

PHARMACEUTICAL DOSAGE SYSTEM

CROSS-REFERENCE TO RELATED APPLICATIONS

This application claims priority to U.S. Provisional Application No. 63/162,505 filed on Mar. 17, 2021, the entire contents of which are expressly incorporated herein by reference.

BACKGROUND

Pharmaceutical dosage packages, also known as blister packages or blister packs, typically include a tray containing one or more dosage forms to be ingested over a prescribed period of time. For instance, during clinical trials, a blister pack typically contains a plurality of blisters that contain pharmaceutical dosage forms of a medication, along with instructions for consumption over the trial period. In a process known as up-titration, the medication is consumed initially at low dosages at the initial day or days, and the dosage progressively increases over subsequent days until reaching a maximum dosage on the final day or days. This process allows the clinician to observe potential side effects that the medication may have on the patient at lower doses, along with the ability to observe the efficacy of the medication throughout the trial period. Additionally, some marketed medications may require an up-titration process when a patient first begins taking the medication.

The progressively increasing dosages up to the final dosage are often multiples of the low dosages. Accordingly, while the low dosages are typically administered in a single dosage form, the progressively increasing dosages up to the final dosage are delivered in multiple dosage forms (i.e., multiple pills). Unfortunately, this results in a large number of dosage forms in a blister pack, thereby increasing the size of the blister pack and complexity of ensuring that the proper dose of medication is consumed. In some instances, the large number of doses to be consumed forecloses the possibility of providing the dosage forms in a blister pack. Further, patients can become confused when assessing which dosage form is to be ingested on which given day throughout the period.

What is therefore needed is an improved method and apparatus for delivering medication that is intended for up-titration consumption.

SUMMARY

In accordance with one aspect of the present disclosure, a pharmaceutical dosage system can include a multiday blister pack having a plurality of cavities, and a plurality of pharmaceutical dosage forms disposed in respective cavities of the plurality of cavities such that each cavity of the plurality of cavities contains only a single one of the plurality of pharmaceutical dosage forms. The cavities can be accessible so as to consume the pharmaceutical dosage forms over a period of multiple days, Each pharmaceutical dosage form can have substantially identical ingredients including at least one active ingredient. A first single pharmaceutical dosage form of the plurality of pharmaceutical dosage forms can have a different quantity of the active ingredient than a second single pharmaceutical dosage form of the plurality of pharmaceutical dosage forms.

BRIEF DESCRIPTION OF THE DRAWINGS

The foregoing summary, as well as the following detailed description of illustrative embodiments of the present application, will be better understood when read in conjunction with the appended drawings. For the purposes of examples of the present disclosure, there is shown in the drawings illustrative embodiments. It should be understood, however, that the application is not limited to the precise arrangements and instrumentalities shown. In the drawings.

DETAILED DESCRIPTION

Figure 1A:
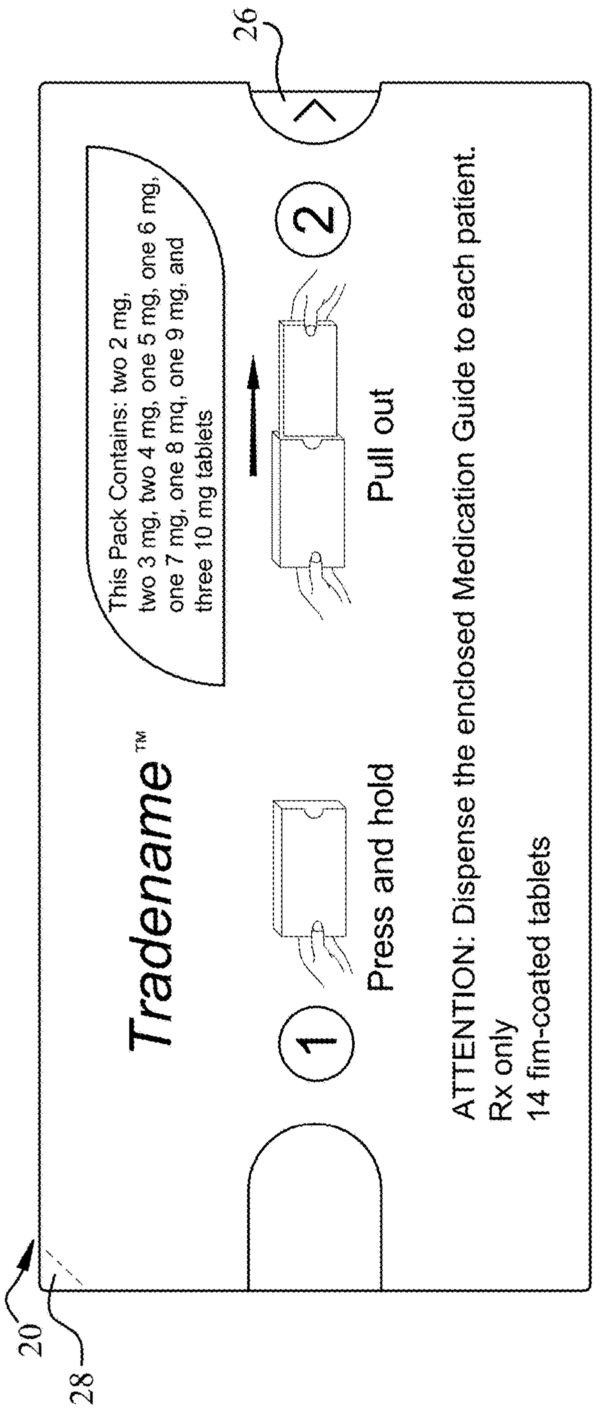
FIG. 1A is a side elevation view of a pharmaceutical package including an outer envelope and an inner envelope disposed in the outer envelope.
Figure 1B:
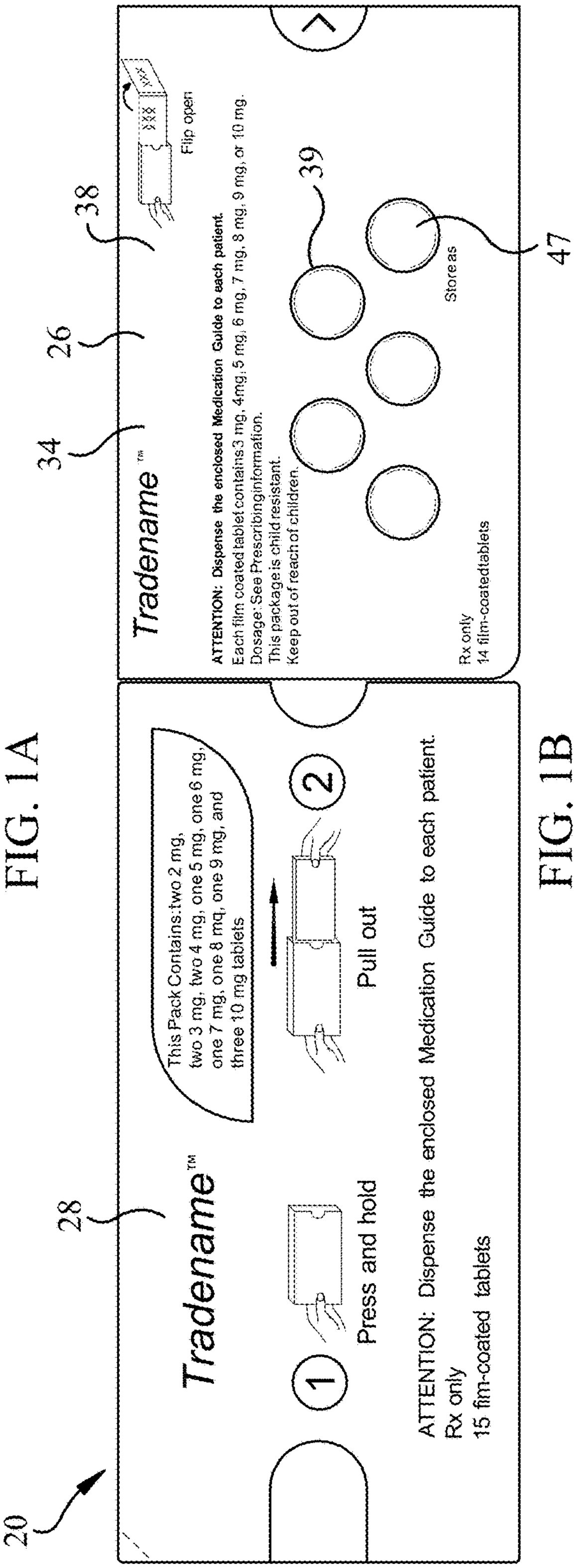
FIG. 1B is a side elevation view of the pharmaceutical package of FIG. 1A, showing removal of the inner envelope from the outer envelope.
Figure 1C:
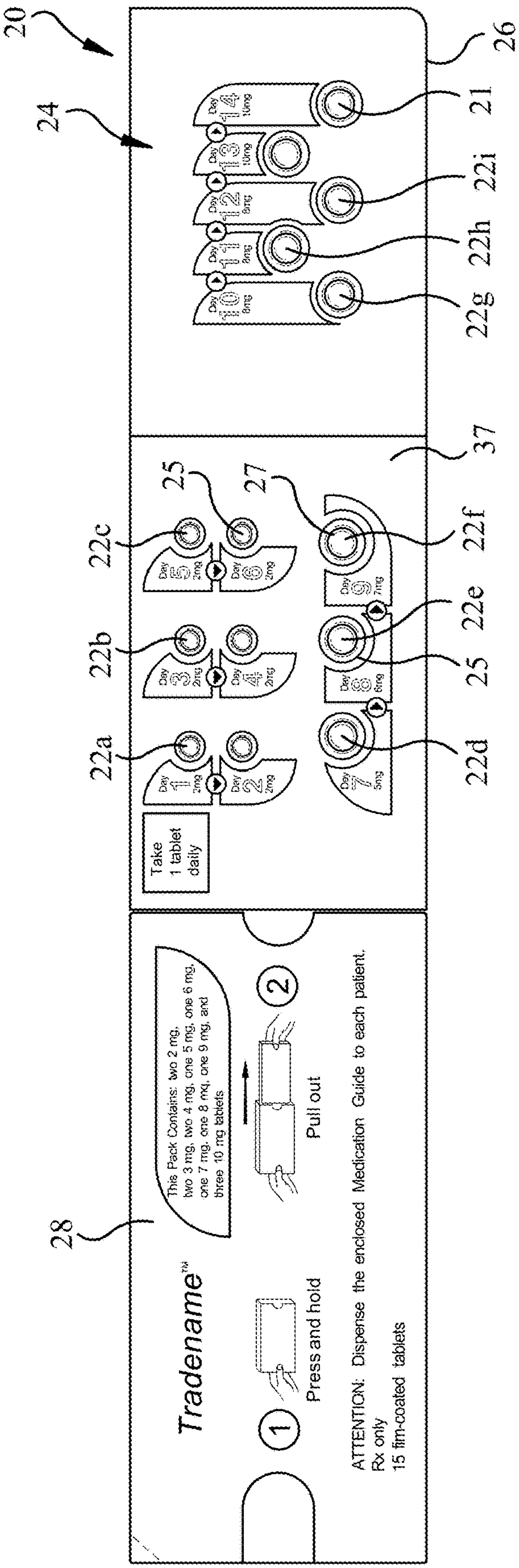
FIG. 1C is a side elevation view of the pharmaceutical package of FIG. 1B, showing the inner envelope further removed from the outer envelope.
Figure 2A:
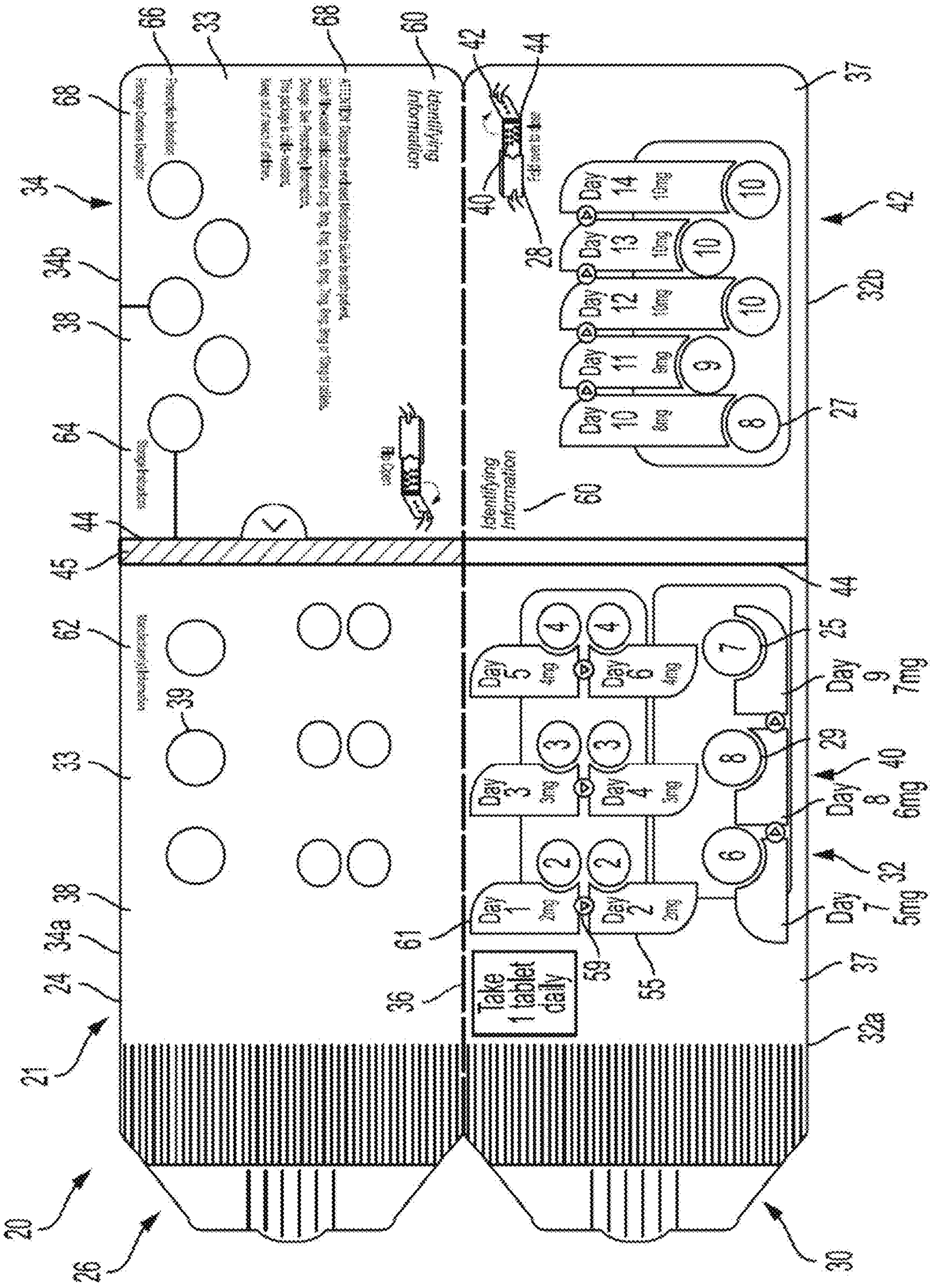
FIG. 2A is a plan view of a first surface of the inner envelope of the pharmaceutical package of FIGS. 1A-1C, shown in an unfolded state, in one example.
Figure 2B:
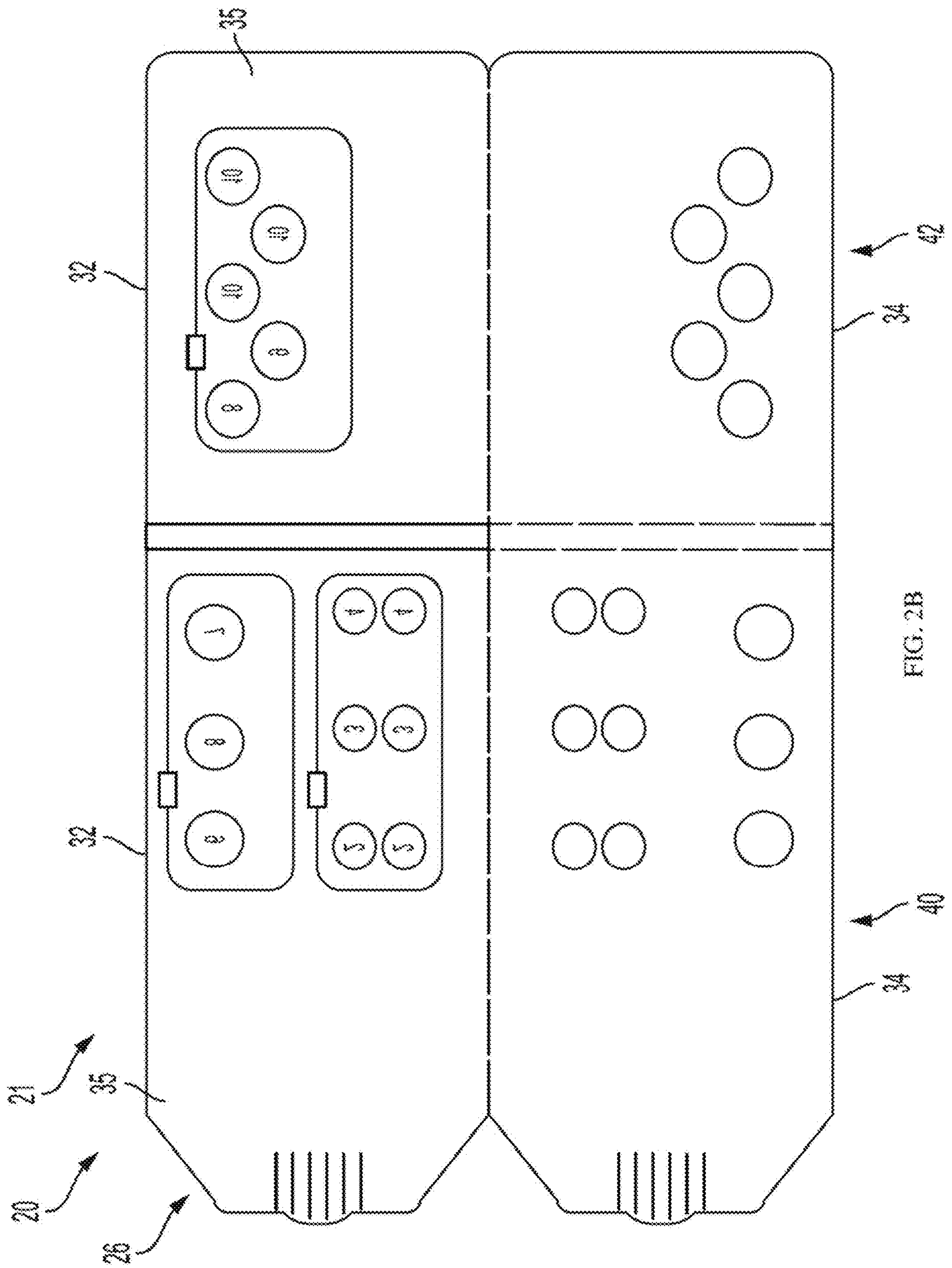
FIG. 2B is a plan view of a second surface of the inner envelope of a pharmaceutical package opposite the first surface illustrated in FIG. 2A.
Figure 2C:
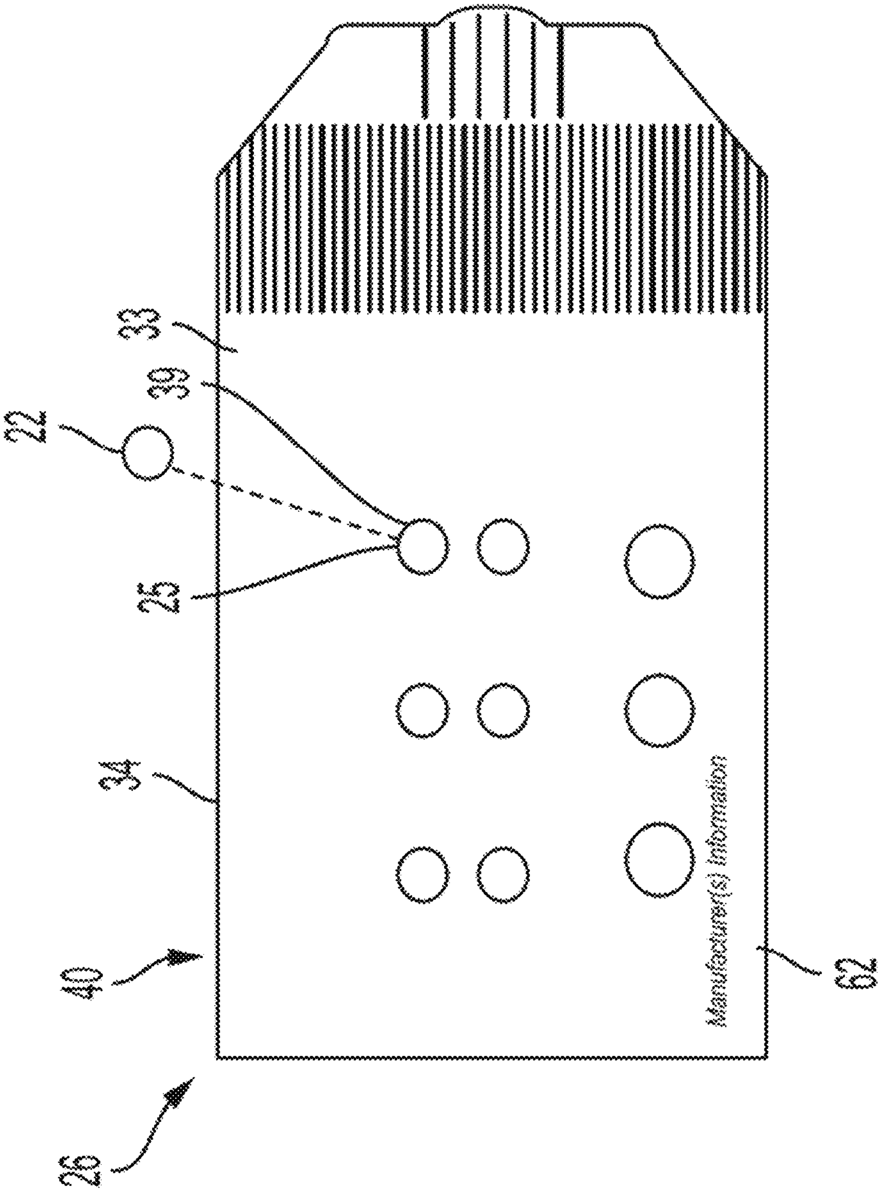
FIG. 2C is a plan view of an inner surface of the inner envelope of FIGS. 2A-2B, showing a dosage form removed from a blister of the inner envelope.
Figure 3:
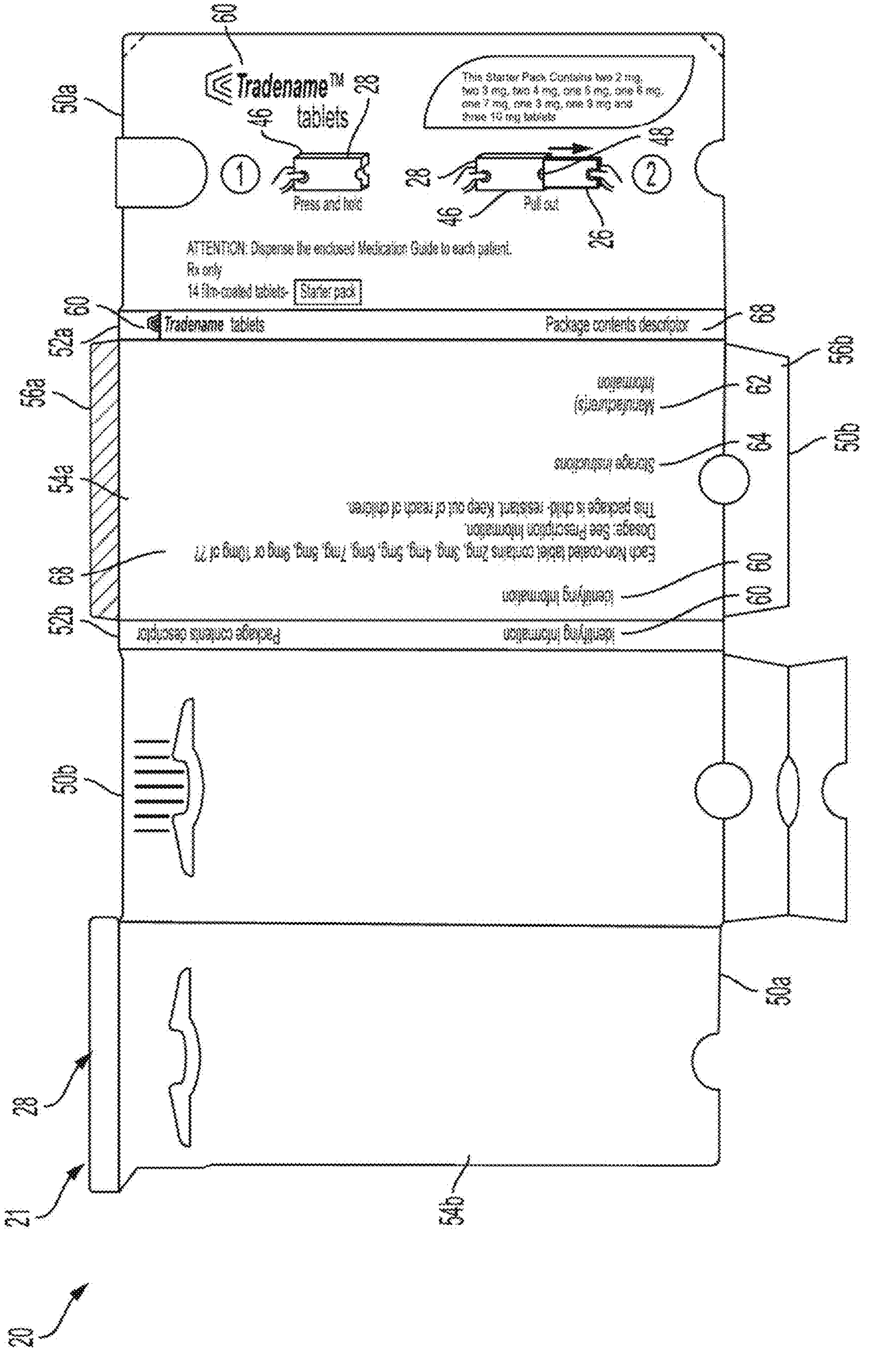
FIG. 3 is a plan view of the outer envelope of the pharmaceutical package of FIG. 1A, shown in an unfolded state.

Referring to FIGS. 1A-1C, a pharmaceutical dosage system 20 can include a multiday blister pack 21 and a medication provided as a plurality of dosage forms 22 that are carried by the blister pack 21. The pharmaceutical dosage system 20 can further include an inner wallet 24 that includes a blister pack 21 and an inner envelope 26 that at least partially surrounds or otherwise supports or carries the blister pack 21. The pharmaceutical dosage system 20 can further include an outer envelope 28 that can contain the inner wallet 24. The inner wallet 24 can be at least partially or entirely removed from the outer envelope 28 to access the dosage forms 22. In particular, the blister pack 21 can contain a plurality of blisters 25 that cooperate with respective frangible seals 47 to define respective internal cavities 27 that, in turn, contain a respective plurality of dosage forms 22. The blisters 25 can be defined by a blister sheet and thus defined by a single structure, or can be individualized blisters 25 that are separate from each other as desired. The dosage forms 22 are to be individually consumed on respective days over a multi-day period of time of an up-titration process, such that only one of the dosage forms 22 is consumed per day. The dosage forms 22 can be administered and consumed over a respective period of time as part of a trial phase (such as phase 2 or phase 3), or can be administered and consumed over a respective period of time as part of an FDA-approved treatment regimen. In some examples, the dosage forms 22 of the pharmaceutical dosage system 20 can be provided as a starter pack that provides an updosing of the medication delivered in the dosage forms 22 over a period of time, which can assist in the reduction of side effects. As will be described in more detail below, the inner envelope 26 can provide information to the user that guides the user to consume the correct dosage form at the correct point in time throughout the dosing schedule.

Advantageously, the dosage forms 22 are provided as a single dosage form to be consumed daily. The dosage forms 22 can be provided in any suitable form as desired. For instance, the dosage forms can be configured for oral ingestion, and can be provided as capsules, pills, pellets, tablets, lozenges, dissolvable strips, or the like. The dosage forms 22 can be configured to be swallowed whole, chewed in the mouth, or disintegrated in the oral cavity.

Each dosage form includes at least one active ingredient. Further, each dosage form can contain at least one inactive ingredient as desired, such as flavoring and/or binders, depending on the medication to be delivered and the type of dosage form. In one example, the medication to be delivered can be as described in U.S. Pat. No. 10,220,023 issued Mar. 5, 2019, which is attached hereto as Exhibit A, and forms part of the present disclosure. One or more of the dosage forms 22 of the blister pack 21 can have different dosages of the at least one active ingredient with respect to one or more others of the dosage forms 22 of the blister pack 21. That is, one or more of the dosage forms 22 of the blister pack 21 can have different quantities of the active ingredient with respect to one or more others of the dosage forms 22 of the blister pack. As a result, for example, a patient can follow the up-titration process while still consuming only a single dosage form (e.g., tablet or capsule) at each stage, for instance each day, of the up-titration process, as compared with taking multiple dosage forms (e.g., tablets) at each stage, for instance each day, of the up-titration process.

In one example, the dosage forms 22 are earmarked to be consumed on different respective days during the multi-day up-titration process. Dosage forms earmarked to be consumed in later days of the multi-day process can have greater dosages of the active ingredient than dosage forms earmarked to be consumed in earlier days of the multi-day process. In particular, the dosage forms 22 can include respective dosages of active ingredient that vary over the multi-day period of time. In one example, the respective dosages of active ingredient of the dosage forms 22 can increase over time. In other examples, the respective dosages of active ingredient of the dosage forms 22 can decrease over time. In still other examples, the respective dosages of active ingredient of the dosage forms 22 can increase over a first period of time, and decrease over a second period of time that can occur before or after the first period of time. All of the dosage forms 22 can include identical active ingredients. Thus, all of the active ingredients of each dosage form 22 are substantially identical to each other. In some examples, all of the dosage forms 22 can also include identical inactive ingredients. The concentrations of active ingredients can differ in those dosage forms 22 that have different dosages of active ingredients from each other. The concentrations of active ingredients can be substantially identical in those dosage forms 22 that have the same dosages of active ingredients as each other. In still other examples, the pharmaceutical dosage system 20 described herein can be used with combination therapies of two or more drugs in order to assist the patient in consuming the two or more therapies in accordance with a prescribed dosing regimen, involving consumption of a single dosage form at each respective stage (for instance each day) of the dosing regimen.

As used herein, the term "substantially," "approximately," "about," and derivatives thereof and words of similar import as used herein in connection with "equal" or "the same" or "identical" or derivatives thereof and words of similar import thereof recognizes that referenced dimensions, sizes, shapes, directions, concentrations or other parameters can include the stated dimensions, sizes, shapes, directions, concentrations or other parameters and up to ±20%, including ±10%, ±5%, ±2%, and ±1%, and less than 1% of the stated dimensions, sizes, shapes, directions, concentrations or other parameters. As used herein, the term "different" or derivatives thereof and words of similar import thereof recognizes that referenced dimensions, sizes, shapes, directions, concentrations or other parameters are different by greater than 20%, such that they are not substantially identical.

Referring now to FIGS. 1A-2C, and as described above, the inner wallet 24 can include the inner envelope 26 and the blister pack 21 that is carried by the inner envelope 26. The inner envelope 26 can include a plurality of openings 29 positioned such that the respective blisters 25 protrude out with respect to the inner envelope 26 through the openings 29. It can therefore be said that the inner envelope 26 supports the plurality of blisters 25. Each cavity 27 can be configured to removably retain a respective dosage form 22 of the plurality of dosage forms 22. That is, a single dosage form 22 can be disposed in each cavity 27, and can be removed from the cavity 27 for consumption on a respective point in time (e.g., day) of the dosing schedule (e.g., multi-day period of time). In one example, each cavity 27 contains no dosage forms other than the single dosage form. Further, in one example, the blister pack 21 contains no dosage forms other than the dosage forms having the at least one active ingredient. Further still, the blister pack 21 can contain no dosage forms other than the dosage forms having the at least one inactive ingredient.

The inner envelope 26 and the outer envelope 28 can be made of any suitable material such as cardboard, heavy paper, or pulp injected material. During manufacturing, the inner envelope 26 can assume a flat configuration (FIGS. 2A-2B), and can subsequently be iterated into a folded configuration (FIGS. 1A-1C) for use as the end product. When the inner envelope 26 is in the flat configuration, the inner envelope body 30 defines an inner panel 32 and an outer panel 34 opposite the inner panel 32. The inner and outer panels 32 and 34 can be disposed on opposite sides of a fold line 36. The inner envelope body 30 further defines a front surface 33 that extends along the inner and outer panels 32 and 34, and a rear surface 35 opposite the front surface 33. The rear surface can carry an adhesive, such as a sealant, that seals the inner panel 32 to the outer panel 34 when the inner envelope 26 has been folded about the fold line 36.

The blisters 25 are each configured to retain a single respective dosage form 22 of the plurality of dosage forms 22. Thus, the blisters 25 can at least partially define the cavities 25, such that the respective dosage forms are disposed in respective cavities of the plurality of cavities 27. The blisters 25 can project out from the front surface 33 of the inner panel 32. The blisters 25 can be formed of an optically transparent material, optically translucent material, or optically opaque material as desired.

The inner and outer panels 32 and 34 are configured to be folded upon each other along the fold line 36 to a folded configuration, such that the rear surface 35 of the inner panel 32 faces the rear surface 35 of the outer panel 34. The rear surface 35 of the inner panel 32 and the rear surface of the outer panel 34 can be adhered to each other as desired. When the inner envelope is in the folded configuration, the front surface 33 of the inner panel 32 can define an inner surface 37 of the inner envelope body 30, and the front surface 33 of the outer panel 34 can define an outer surface 38 of the inner envelope body 30 that is opposite the inner surface 37. The blisters 25 can extend out from the inner surface 37.

In some examples, the inner envelope 26 can include a first pair 40 of the inner and outer panels 32 and 34, respectively, and a second pair 42 of the inner and outer panels 32 and 34, respectively. The inner envelope body 30 can include at least one second fold line 44 that intersects the fold line 36, which can be referred to as a first fold line 36. In particular, the second fold line 44 can be substantially perpendicular to the first fold line 36. After the inner envelope body 30 is folded along the first fold line 36 in the manner described above, the inner envelope body 30 can be folded along the second fold line 44 to assume a final folded configuration whereby the inner surface 37 of the inner panel 32 of the first pair 40 of panels faces the inner surface 37 of the inner panel 32 of the second pair 42 of panels. Alternatively, the inner envelope body 30 can be folded along the second fold line 44 to assume a final folded configuration whereby the inner surface 37 of the inner panel 32 of the first pair 40 of panels, also referred to as a first inner panel 32*a*, faces the inner surface 37 of the inner panel 32 of the second pair 42 of panels, also referred to as a second inner panel 32*b*. The outer surface 38 of the outer panel 34 of the first pair 40 of panels, also referred to as a first outer panel 34*a*, faces away from the outer surface 38 of the outer panel 34 of the second pair 42 of panels, also referred to as a second outer panel 34*b*. Once the inner envelope body 30 is in the final folded configuration, the inner envelope 26 can be inserted into the outer envelope 28.

The at least one second fold line 44 can be configured as a pair of second fold lines 44 that extend parallel to each other, and folded such that a portion of the inner envelope body 30 that is disposed between the second fold lines 44 can define an end panel 45 that adjoins the first pair 40 of panels 32 and 34 and the second pair 42 of panels 32 and 34.

In some examples, a first plurality of blisters 25 can extend from the inner surface 37 of the first inner panel 32*a*, and a second plurality of blisters 25 can extend from the inner surface 37 of the second inner panel 32*b*. In other examples, the inner envelope 26 can include only a single inner panel 32 that supports all of the blisters 25 of the blister pack 21. Thus, it can be said that the inner surface 37 of at least one inner panel 32 defines the inner surface 37 of the inner envelope body 30, and thus of the inner envelope 26. Similarly, the outer surface 38 of at least one of inner panel 32 defines the outer surface 38 of the inner envelope body 30, and thus of the inner envelope 26. Thus, the inner envelope body 30 can undergo more or less than two folding operations, also referred to herein as at least one folding operation. In other examples, the inner envelope 26 can be constructed so as to be configured for insertion into the outer envelope 28 without first undergoing any folding operations.

Referring now to FIGS. 1A-C and FIG. 3, the outer envelope 28 can include an outer housing 46 that defines a receptacle 48 sized to removably receive the inner envelope 26. In particular, the outer envelope 28 can include a plurality of panels including first and second outer side panels 50*a* and 50*b*, and first and second end panels 52*a* and 52*b* that adjoin the first and second outer side panels 50*a* and 50*b*. The panels 50*a-b* and end panels 52*a-b* define respective external surfaces 54*a* and internal surfaces 54*b* opposite the external surfaces 54*a*. The internal surfaces can face the receptacle 48. The outer envelope 28 can further include first and second inner panels 54 that face the internal surfaces 54*b* of the outer side panels 50*a* and 50*b*. The outer envelope 28 can further include upper and lower tabs 56*a* and 56*b*, respectively, that can close at least one of the respective upper and lower ends of the receptacle 48. During use, one of the upper and lower ends can be gripped, while a force is applied to the inner envelope 26 that removes the inner envelope 26 from the receptacle 48.

The inner envelope 26 can be at least partially removable from the outer envelope 28. For instance, in some examples, the inner envelope 26 is unable to be fully removed from the outer envelope 28. In other examples, the inner envelope 26 can be entirely removed from the outer envelope 28. When the inner envelope 26 is at least partially removed from the outer envelope 28, the inner envelope can be unfolded along the second fold line 44. The blister pack 21 can include regions 39 that are aligned with respective ones of the blisters 25, and are designed and configured to be penetrated so as to access the dosage form 22 disposed in the respective cavities 27 defined by the blisters 25 and the regions 39. For instance, the regions 39 can be configured as pull-away regions aligned with respective ones of the cavities 27. Thus, each pull-away region can be removed to expose the cavity 25 of an aligned one of the blisters 25. Alternatively, the regions 39 can be weakened, and designed to be broken to access the dosage form 22 disposed in the aligned one of the cavities 27. In one example, the regions 39 are formed as frangible seals 47, which can be configured as a foil in some examples, designed to be ruptured for removal of the respective dosage forms 22 from the cavities 27 that is defined by the regions 39 and the respective aligned blisters 25.

The inner and outer envelopes 26 and 28 can include information pertaining to the pharmaceutical dosage system 20 as desired. In one example, the inner envelope body 30 can include medication identifying information 60 that identifies the dosage forms 22. The medication identifying information 60 can also be disposed at the external surfaces 54*a* of the outer envelope, for instance at one or more up to all of the first and second outer side panels 50*a* and 50*b* and first and second end panels 52*a* and 52*b*. The medication identifying information 60 can include one or more tradenames, trademarks, or other information related to the dosage forms 22, including an indication of the active ingredient(s) of the dosage forms 22.

The blister pack 21 can further include manufacturer information 62 regarding the manufacturer(s) of either or both of the blister pack 21 and the dosage forms 22. The manufacturer information 62 can identify the manufacturer(s) and include contact information as desired. The manufacturer information 62 can be located at the inner envelope body 60, for instance at the front surface 33 of the outer panel 34 of the first pair 40. Alternatively or additionally, the manufacturer information 62 can be located at the outer envelope 28, for instance at either or both of the second side panel 50*b*.

The blister pack 21 can further include storage instructions 64 that can include information regarding how to best store the pharmaceutical dosage system 20. For instance, the storage instructions 64 can include storage temperature information, and storage temperatures that are acceptable during excursions. The storage instructions 64 can be carried by the inner envelope body 30, for instance at the outer surface 38 of the second panel 64 of the second pair 42 of panels. The storage instructions can further be carried by the outer envelope 28, for instance at the external surface 54*a* of the second side panel 50*b*.

The blister pack 21 can further include a prescription identifier 66 that includes information indicating that the dosage forms are to be sold and consumed by prescription only, as applicable. The prescription identifier can be carried by the inner envelope body 30, for instance at the outer surface 38 of the second panel 34 of the second pair of panels 42.

The blister pack 21 can further include a package contents descriptor 68 that includes an identification of any one or more of a quantity of dosage forms 22 carried by the blister pack 21, an indication of the number of dosage forms 22 at each dosage level, and an indication of the various dosage levels of the dosage forms 22. The package contents descriptor 68 can be carried by the inner envelope body 30, for instance at the outer surface 38 of the second panel 34 of the second pair of panels 42. The package contents descriptor 68 can be carried by the outer envelope 28, for instance at the external surface 54*a* of the second outer side panel 50*b*, and at the external surface 54*a* of the first end panel 52*a*. Further, the pharmaceutical dosage system can include Instructions for Use (IFUs) for the dosage forms 22. For instance, the IFUs can be defined by a printed medium, such as printed paper, that can be inserted into the outer envelope 28 along with the inner wallet 24.

Referring again to FIGS. 1A-C and FIG. 2A, in one example only a single dosage form 22 is disposed in each cavity 27. It is recognized, however, that in other examples more than one dosage form 22 of the plurality of dosage forms 22 can be disposed in a respective at least one of the cavities 27. Those dosage forms 22 of the plurality of dosage forms 22 having a higher dosage of the active ingredient than other dosage forms 22 can similarly be sized greater than the other dosage forms. Accordingly, the cavities 27 that retain the greater sized dosage forms 22 can be sized greater than other cavities 27 that retain the other dosage forms. Similarly, the cavities 27 that are sized greater can similarly be sized greater than the other cavities 27. The greater sized cavities 27 can provide a visual indication to the patient or caregiver that those cavities 27 contain respective dosage forms 22 having a greater quantity of active ingredient than the other smaller cavities 27. The greater sized cavities 27 can be defined by greater sized blisters 25 and greater sized frangible seals 47 with respect to the blisters 25 and frangible seals 47 that define respective cavities that contain smaller sized dosage forms 22 that contain a lesser quantity of active ingredient. Alternatively, all of the blisters 25 and cavities 27 can have substantially identical sizes and shapes.

Further, because, in some examples, only a single dosage form 22 of the plurality of dosage forms 22 is to be consumed at each point in time of a dosing schedule (e.g., each day) over an entirety of the dosing schedule (e.g., multiple days), the blister pack 21 contains fewer dosage forms as compared to a dosing regimen in which multiple dosage forms are provided and ingested at each point in the dosing regimen. Accordingly, the blister pack 21, and in particular the cavities 27 of the inner envelope 26, can be sized to retain all dosage forms 22 to be administered during the up-titration process over the dosing schedule. Further, in some examples, the blister pack 21 includes no dosage forms other than the dosage forms to be consumed during the dosing schedule (e.g., multi-day up-titration process).

As described above, dosage forms 22 earmarked to be consumed in later days of a multi-day process can have greater dosages of the active ingredient than dosage forms earmarked to be consumed in earlier days of the multi-day process. In one example, the pharmaceutical dosage system 20 can have earmarking information 55 associated with the respective dosage forms 22. The earmarking information can set forth the point in time at which the dosage forms 22 are to be consumed over the dosing schedule (e.g., day 3 of a multi-day period), thereby rendering the dosing schedule intuitive to the end user. For instance, the earmarking information can include either or both of graphical and alphanumerical information that identifies which of the dosage forms 22 are be consumed at each time interval over the dosing schedule. The information can be printed or otherwise carried by the inner envelope 26 at a location immediately adjacent the corresponding opening 29 that receives the corresponding blister 25 that contains the individual pharmaceutical dosage form 22 in the corresponding cavity 27. The term "immediately adjacent" refers to a location closer to the corresponding opening 29 than any other opening 29 of the plurality of openings 29. Thus, the term "immediately adjacent" can also refer to a location closer to the corresponding blister 25 than any other blister 25 of the plurality of blisters 25. In other examples, the inner envelope 26 can be omitted and the earmarking information can be provided directly on the blister pack 21. In further examples, the outer envelope may be omitted.

The information 55 can include a numeric identifier corresponding to the unique point in time (e.g., day) of the dosing schedule (e.g., multi-day period) on which the dosage form 22 disposed in the corresponding cavity 27 is to be consumed over the dosing schedule. For instance, the information 55 disposed immediately adjacent the cavity 25 that contains the dosage form 22 to be consumed on the first day of a multi-day period can include the number "1." The information 55 can further include the dosage of active ingredient of the dosage form 22 in the immediately adjacent cavity 27. The information 55 can be printed on the inner surface 37 of the inner envelope 26 adjacent the respective cavity 27, for instance at the first panels 32 of each of the first and second pairs 40 and 42 of panels. Alternatively, the information 55 can be printed directly on the blister pack 21.

The information 55 can further include graphical information that indicates the sequence in which the dosage forms 22 are to be removed from the inner wallet 24 and ingested. For instance, the information can include arrows 59 that are disposed immediately adjacent respective openings 29 and corresponding cavities 25 that contain respective select dosage forms 22 to be consumed on respective unique days of the multi-day period. For example, each arrow can point toward an opening 29 and corresponding cavity 25 that contains a subsequent dosage form that is to be consumed on a respective unique day that is immediately subsequent to the unique day on which the select dosage forms 22 is to be consumed. The blister pack 21 can be configured such that the opening 29 and corresponding cavity 25 that contains the subsequent dosage form 20 can be disposed adjacent the opening 29 and corresponding cavity 25 that contains the select dosage form 22. Thus, the dosage forms 22 can be arranged along the inner wallet 24 sequentially in the order in which they are to be consumed. In one example, the arrows can extend from the numeric identifier corresponding to the unique day of the select dosage form 22 toward the numeric identifier corresponding to the unique day that the subsequent dosage form is to be consumed. During use, the patient or caregiver removes the dosage form 22 for consumption that is identified by an arrow pointed from a most recently emptied cavity 25 toward a respective cavity 25 that contains the subsequent dosage form 22 to be ingested in sequence. The graphical information can further include curved surfaces 61 that are disposed immediately adjacent respective cavities 27 that contain respective select dosage forms 22. The curved surfaces 61 can be curved in a direction toward corresponding cavities 27 that contain respective subsequent dosage forms 22 to be consumed on a unique day that is immediately subsequent to the unique day on which the select dosage forms 22 are to be consumed.

In a multi-day dosage regimen, each cavity 27 thereby contains a single dosage form 22 that is earmarked for consumption on a different day of the multi-day period of time. Some of the blisters 25 can contain dosage forms 22 having substantially identical dosages of active ingredient. The dosage forms 22 having substantially identical dosages of active ingredient can be earmarked for consumption on consecutive days of the multi-day period of time. Dosage forms 22 having increased dosages can be earmarked for consumption on days occurring after days on which dosage forms having lower dosages are earmarked for consumption.

With continuing reference to FIGS. 1A-C and FIG. 2A, the pharmaceutical dosage forms 22 can include at least one first single pharmaceutical dosage form 22*a* and a final single pharmaceutical dosage form 22. The first single pharmaceutical dosage form 22 can be consumed at the first point in time of the dosing schedule (e.g., the first day of a multi-day period of time), and the final single pharmaceutical dosage form 22 to be consumed at the last point in time of the dosing schedule (e.g., the last day of a multi-day period of time). The dosage forms 22 can include a plurality of first single pharmaceutical dosage forms 22*a* that are to be consumed one per day for the same plurality of days at the beginning of the multi-day period of time. The dosage forms 22 can further include a plurality of final single pharmaceutical dosage forms 22 that are to be consumed one per day for the same plurality of final days at the end of the multi-day period of time. The final single pharmaceutical dosage form 22 can have a higher dosage of active ingredient than the first single pharmaceutical dosage form 22.

The pharmaceutical dosage forms 22 can in also include any number of intermediate single pharmaceutical dosage forms 22 that are consumed at intermediate points in time of the dosing schedule (e.g., on days between the at least one day on which the at least one first single pharmaceutical dosage form 22*a* is consumed and the at least one day on which the at least one final single pharmaceutical dosage form 22 is consumed). The pharmaceutical dosage forms 22 can include any number of intermediate single pharmaceutical dosage forms 22 as desired, or can be devoid of any intermediate single pharmaceutical dosage forms.

In one example, the pharmaceutical dosage forms 22 include at least one first single pharmaceutical dosage form 22*a* of the plurality of pharmaceutical dosage forms 22, which has a different quantity of the active ingredient than at least one second single pharmaceutical dosage form 22*b* of the plurality of pharmaceutical dosage forms 22. Depending on the active ingredient, the at least one second single pharmaceutical dosage form 22 can have from approximately 1.5 times to approximately ten times, including approximately two times, approximately 2.5 times, approximately three times, approximately 3.5 times, approximately four times, approximately 4.5 times and approximately five times the quantity of active ingredient than the at least one first single pharmaceutical dosage form 22.

The plurality of pharmaceutical dosage forms 22 can further include at least one third single pharmaceutical dosage form 22*c* that has approximately two times more of the active ingredient than the at least one first single pharmaceutical dosage form 22*a*. The plurality of single pharmaceutical dosage forms 22 can further include at least one fourth single pharmaceutical dosage form 22*d* that has approximately 2.5 times more of the active ingredient than the at least one first single pharmaceutical dosage form 22*a*. The plurality of single pharmaceutical dosage forms 22 can further include at least one fifth single pharmaceutical dosage form 22*e* that has three times more of the active ingredient than the at least one first single pharmaceutical dosage form 22*a*. The plurality of single pharmaceutical dosage forms 22 can include at least one sixth single pharmaceutical dosage form 22*f* that has 3.5 times more of the active ingredient than the at least one first single pharmaceutical dosage form 22*a*. The plurality of single pharmaceutical dosage forms 22 can include at least one seventh single pharmaceutical dosage form 22*g* that has four times more of the active ingredient than the at least one first single pharmaceutical dosage form 22*a*. The plurality of single pharmaceutical dosage forms 22 can include at least one eighth single at least one single pharmaceutical dosage form 22*h* that has 4.5 times more of the active ingredient than the at least one first single pharmaceutical dosage form 22*a*. The plurality of single pharmaceutical dosage forms 22 comprises at least one ninth single pharmaceutical dosage form 22*i* that has five times more of the active ingredient than the at least one first single pharmaceutical dosage form 22*a*. In some examples, the plurality of single pharmaceutical dosage forms 22 comprises at least one tenth single pharmaceutical dosage form 22*i* that has ten times more of the active ingredient than the at least one first single pharmaceutical dosage form 22*a*.

In one example, the first single pharmaceutical dosage form 22*a* can include approximately 2 mg of active ingredient. The second single pharmaceutical dosage form 22*b* can include approximately 3 mg of active ingredient. The third single pharmaceutical dosage form 22*c* can include approximately 4 mg of active ingredient. The fourth single pharmaceutical dosage form 22*d* can include approximately 5 mg of active ingredient. The fifth single pharmaceutical dosage form 22*e* can include approximately 6 mg of active ingredient. The sixth single pharmaceutical dosage form 22*f* can include approximately 7 mg of active ingredient. The seventh single pharmaceutical dosage form 22*g* can include approximately 8 mg of active ingredient. The eighth single pharmaceutical dosage form 22*h* can include approximately 9 mg of active ingredient. The ninth single pharmaceutical dosage form 22*i* can include approximately 10 mg of active ingredient. The dosage of active ingredients of the first through ninth dosage forms 22*a*-22*i* are presented as one example, and it is appreciated that the specific dosages of other examples may differ.

In accordance with one example of a particular dosing regimen, two of the first single pharmaceutical form 22*a* can be consumed on first and second days, respectively, of the regimen. Two of the second of the first single pharmaceutical form 22*b* can be consumed on third and fourth days, respectively, of the regimen. Two of the third single pharmaceutical form 22*c* can be consumed on fifth and sixth days, respectively, of the regimen. The fourth single pharmaceutical form 22*d* can be consumed on a seventh day of the regimen. The fifth single pharmaceutical form 22*e* can be consumed on an eighth day of the regimen. The sixth single pharmaceutical form 22*f* can be consumed on a ninth day of the regimen. The seventh single pharmaceutical form 22*g* can be consumed on a tenth day of the regimen. The eighth single pharmaceutical form 22*h* can be consumed on an eleventh day of the regimen. Three of the ninth single pharmaceutical form 22*i* can be consumed on twelfth, thirteenth, and fourteenth days, respectively, of the regimen. This particular dosing regimen is specific to one particular example, and can vary as desired in other examples, and depending on the dosage forms 22. In one example, the dosage forms 22 can be configured as ponesimod dosage forms, available from Janssen Pharmaceuticals, a Johnson & Johnson company with a principle place of business in Raritan, NJ. Thus, the active ingredient can be designed and used for the treatment of multiple sclerosis.

Each of the single pharmaceutical dosage forms 22 can further include indicia that visually distinguish the single pharmaceutical dosage forms 22 from one or more others of the single pharmaceutical dosage forms 22. For instance, each of the dosage forms can include a number that can be disposed on a first surface of the dosage forms 22 that identifies the approximate dosage of active ingredient of dosage form 22. Thus, in the example presented above, the first single pharmaceutical dosage form 22*a* can include the number "2" disposed on the first surface that corresponds to the approximately 2 mg of active ingredient. The second single pharmaceutical dosage form 22*b* can include the number "3" disposed on the first surface that corresponds to the approximately 3 mg of active ingredient. The third single pharmaceutical dosage form 22*c* can include the number "4" disposed on the first surface that corresponds to the approximately 4 mg of active ingredient. The fourth single pharmaceutical dosage form 22*d* can include the number "5" disposed on the first surface that corresponds to the approximately 5 mg of active ingredient. The fifth single pharmaceutical dosage form 22*e* can include the number "6" disposed on the first surface that corresponds to the approximately 6 mg of active ingredient. The sixth single pharmaceutical dosage form 22*f* can include the number "7" disposed on the first surface that corresponds to the approximately 7 mg of active ingredient. The seventh single pharmaceutical dosage form 22*g* can include the number "8" disposed on the first surface that corresponds to the approximately 8 mg of active ingredient. The eighth single pharmaceutical dosage form 22*h* can include the number "9" disposed on the first surface that corresponds to the approximately 9 mg of active ingredient. The ninth single pharmaceutical dosage form 22*i* can include the number "10" disposed on the first surface that corresponds to the approximately 10 mg of active ingredient.

Further still, the indicia can include a color of each of the single pharmaceutical dosage forms 22 that is unique with respect to one or more others up to all others of the dosage forms 22. In one particular example, the first single pharmaceutical dosage form 22*a* and the fifth single pharmaceutical dosage form 22*e* can have the same color. The second single pharmaceutical dosage form 22*b* and the sixth single pharmaceutical dosage form 22*f* can have the same color different from the color of the first and fifth single pharmaceutical dosage forms 22*a* and 22*e*. The third single pharmaceutical dosage form 22*c* and the seventh single pharmaceutical dosage form 22*g* can have the same color that is different from the respective colors of the first and fifth single pharmaceutical dosage forms 22*a* and 22*e*, and the color of the second and sixth single pharmaceutical dosage forms 22*b* and 22*f*. For instance, the first single pharmaceutical dosage form 22*a* can be colored white. The second single pharmaceutical dosage form 22*b* can be colored red. The third single pharmaceutical dosage form 22*c* can be colored purple. The fourth single pharmaceutical dosage form 22*d* can be colored green. The fifth single pharmaceutical dosage form 22*e* can be colored white. The sixth single pharmaceutical dosage form 22*f* can be colored red. The seventh single pharmaceutical dosage form 22*g* can be colored purple. The eighth single pharmaceutical dosage form 22*h* can be colored brown. The ninth single pharmaceutical dosage form 22*i* can be colored orange. It should be appreciated that the colors of the single pharmaceutical dosage forms can differ in other examples.

As described above, at least one of the dosage forms 22 of the plurality of dosage forms 22 having a higher dosage of the active ingredient than other dosage forms 22 can similarly be sized greater than the other dosage forms. Accordingly, the blisters 25 that retain the greater sized dosage forms 22 can be sized greater than other blisters 25 that retain the other dosage forms. Thus, at least a first group of the single pharmaceutical dosage forms 22 can be defined that are sized and shaped substantially identical to each other. Correspondingly, a first group of blisters 25 can be defined that retain respective individual dosage forms 22 of the first group of dosage forms 22, and are sized and shaped substantially identical to each other. Similarly, at least a second group of the single pharmaceutical dosage forms 22 can be defined that are sized and shaped substantially identical to each other. Correspondingly, a second group of blisters 25 can be defined that retain respective individual dosage forms 22 of the second group of dosage forms 22, and are sized and shaped substantially identical to each other. Thus, the dosage forms 22 of the first group of dosage forms 22 can have a first size, and the dosage forms 22 of the second group of dosage forms 22 can have a second size greater than the first size.

In one example, the dosage forms 22 of the first group of dosage forms can define a maximum first cross-sectional dimension between approximately 2 mm and approximately 8 mm. For instance, the maximum first cross-sectional dimension can be approximately 5 mm. The dosage forms 22 of the second group of dosage forms 22 can define a maximum second cross-sectional dimension in a range from approximately 3 mm to approximately 15 mm. For instance, the maximum second cross-sectional dimension can be approximately 8.6 mm. In one example, the dosage forms 22 can be round, such as circular, in cross section such that the cross-sectional dimensions are diameters. It should be appreciated that the size ranges are provided by example only, and can vary depending on the dosage form. In some examples, the dosage forms 22 can include a tenth single pharmaceutical dosage form that contains approximately 20 mg of active ingredient. The tenth single pharmaceutical dosage form can be included in the second group of single pharmaceutical dosage forms. The tenth single pharmaceutical dosage form can include the number "20" on the first surface. Further, the tenth single pharmaceutical dosage form can have a color that is different than all other dosage forms, such as yellow.

The single pharmaceutical dosage forms 22 can define respective second surfaces opposite the first surfaces. The second surfaces can include respective indicia that provide a visual indication of the size of the respective single pharmaceutical dosage forms 22. For instance, the respective second surfaces of the single pharmaceutical dosage forms 22 of the first group can contain a symbol, and the respective second surfaces of the single pharmaceutical dosage forms 22 of the second group can contain a symbol along with an identifier that distinguishes the dosage forms 22 of the second group from the dosage forms 22 of the first group. In one example, the indicia can be an arch. The identifier can be the letter "A." It should be appreciated, of course, the symbols and identifier can differ in other examples.

The dosage forms 22 of the second group of dosage forms can have more active ingredient than the dosage forms of the first group of dosage forms. It should be appreciated, of course, that at least one of the dosage forms 22 of the first group of dosage forms can have substantially the same or different amounts of active ingredient than other dosage forms 22 of the first group of dosage forms. Similarly, at least one of the dosage forms 22 of the second group of dosage forms can have substantially the same or different amounts of active ingredient than other dosage forms 22 of the second group of dosage forms. In one example, the first group of dosage forms can include the first through third pharmaceutical dosage forms 22*a*-22*c*, and the second group of dosage forms can include the fourth through ninth pharmaceutical dosage forms 22*d*-22*i*. It should be appreciated, of course, that the pharmaceutical dosage forms 22 can include any number of groups of dosage forms as desired having respective different sizes and/or shapes than the other groups of dosage forms.

The cavities 27 containing the respective at least one first, second, third, fourth, fifth, sixth, seven, eighth, and ninth single pharmaceutical dosage forms 22*a*-22*i* can be arranged sequentially on the multiday blister pack with respect to the day on which the dosage form is to be consumed. Further, any one or more up to all of the at least one first, second, third, fourth, fifth, sixth, seven, eighth, and ninth single pharmaceutical dosage forms 22*a*-22*i* can include a plurality of dosage forms each disposed in respective ones of the cavities 27. For instance, the at least one first single pharmaceutical dosage form 22 can include a plurality of first single pharmaceutical dosage forms 22*a* that are disposed in respective individual cavities 27 of the plurality of cavity 27. The at least one second single pharmaceutical dosage form 22*b* can further include a plurality of the second single dosage forms 22*b* each disposed in respective individual cavities 27 of the plurality of cavities 27. Similarly, the at least one third single dosage form 22*c* can include a plurality of third single dosage forms 22*c* each disposed in respective individual cavities 27 of the plurality of cavities 27. Further still, the at least one ninth single dosage form 22*i* can include a plurality of ninth single dosage forms 22*i* each disposed in respective cavities 27 of the plurality of cavities 27.

In one example, the plurality of ninth single dosage forms can be greater in number than each of the more than one first single dosage form, the more than one second single dosage form, and the more than one third single dosage form. It should be appreciated in this example that the at least one ninth single pharmaceutical dosage form 22*i* can define the final single pharmaceutical dosage form. The at least one second single pharmaceutical dosage form 22*b* through the at least one eighth single pharmaceutical dosage form 22*h* can define the intermediate dosage forms 22.

The number of respective dosage forms 22 of the first, final, and intermediate dosage forms is presented by way of example only, and it is appreciated that any number of the dosage forms is contemplated. Further, while nine different dosage forms 22 having different dosages are described herein, it is appreciated that the blister pack 21 can contain any number of dosage forms having different dosages as desired. Further still, the number of dosage forms 22 of the blister pack 21, and thus the number of corresponding days vary depending on the number of days in the multi-day period of time of the up-titration process.

It should be appreciated that the in one example, the dosage forms 22 of the pharmaceutical dosage system 20 are designed and configured to be consumed at each stage over a dosing regimen. In one example, each stage can be a day, such that the dosage form 22 are consumed each day over the multi-day process of the dosing regimen. It should be appreciated, however, that the dosage forms 22 can be designed and configured to be consumed at different rates, and not limited to a dosing regimen whereby the dosage forms 22 are taken once per day. For instance, each stage over the dosing regimen can occur more than once per day. Thus, the dosage forms 22 can in some examples be configured for consumption in a multi-day up-titration process whereby the dosage forms 22 are consumed more than once (for instance twice or more) per day. Alternatively still, each stage over the dosing regimen can occur less than once per day. Thus, the dosage forms 22 can in some examples be configured for consumption in a multi-day up-titration process whereby one or more of the dosage forms 22 are consumed every other day, or less frequency still after the passage of multiple days. In still other examples, it is envisioned that the dosing regimen can last a single day or less than a single day, and each stage over the dosing regimen can occur after the passage of hours and/or minutes through out the single day.

Referring again to FIGS. 1A-3 generally, a method for fabricating the pharmaceutical dosage system 20 can include fabricating either or both of the inner wallet 24, including the inner envelope 26 and the blister pack 21, and the outer envelope 28 in the manner described above, and inserting the inner wallet 24 into the outer envelope 28 as desired. The method can further include the step of printing on the inner envelope adjacent each of the cavities 27, and in particular on the inner surface 37 of the inner envelope body 30, the respective point in time (e.g., day) of the dosing schedule (e.g., multi-day up-titration schedule) that the dosage form to be inserted in, and later that is disposed in, the respective cavity 27 is to be consumed. The method can further include the step of printing on the inner envelope adjacent each of the cavities 27, and in particular on the inner surface 37 of the inner envelope body 30, the dosage of the single dosage form 22 to be inserted in, and later that is disposed in, the respective cavity 27 is to be consumed. Alternatively, this information can be printed directly on the blister pack 21.

A method of consuming a medication can include the steps of removing a respective single dosage form 22 of the plurality of the dosage forms 22 from the respective cavity 27 at a select period of time (such as a select day), and consuming a first dose of the medication by consuming the respective single dosage form 22. The respective single dosage form 22 is consumed at a point in time in the dosing schedule (e.g., on a select day) that is earmarked on the blister pack 21 along the dosing schedule (e.g., multi-day period of time). The method can include, at a subsequent point in time (e.g., on a subsequent day), consuming a second dose of the medication in a second single dosage form 22, wherein the second dose has more active ingredient of the medication than the first dose. The respective single dosage form 22 having the second dose is consumed at a different point in time (e.g., on a different day) that is earmarked on the blister pack 21 along the dosing schedule. In one example, no other dosage forms 22 of the plurality of dosage forms 22 are consumed other than the dosage forms earmarked for consumption at the specified points in time (e.g., on the respective days).

Another method of administering the medication performed by a healthcare provider can include the steps of removing the dosage forms 22 from the respective cavities 27 in the manner described above, and administering it to a patient. The method of administering the medication can include the step of delivering the blister pack 20 to the patient or healthcare provider.

It should be appreciated that the illustrations and discussions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should be further appreciated that the various alternative embodiments described above with respect to one illustrated embodiment can apply to all embodiments as described herein, unless otherwise indicated.

What is claimed is:

1. A pharmaceutical dosage system comprising:

an inner wallet that includes multiday blister pack having a plurality of blisters that at least partially define a corresponding plurality of cavities, and an inner panel that carries the blister pack, wherein the blisters extend through respective openings of the inner panel; and a plurality of pharmaceutical dosage forms disposed in respective cavities of the plurality of cavities, such that each cavity of the plurality of cavities contains only a single one of the plurality of pharmaceutical dosage forms, wherein the cavities are accessible so as to consume the pharmaceutical dosage forms on respective unique days over a multi-day period, and all active ingredients of each of the pharmaceutical dosage forms are substantially identical to each other, wherein the pharmaceutical dosage forms are arranged along the inner wallet sequentially in the order in which they are to be consumed, wherein each of the pharmaceutical dosage forms includes indicia that visually distinguish each of the pharmaceutical dosage forms from one or more others of the single pharmaceutical dosage forms, wherein the inner wallet contains earmarking information that sets forth a dosing schedule during which of the pharmaceutical dosage forms are to be consumed over the multi day period, and wherein the pharmaceutical dosage forms comprise:

two of a first pharmaceutical dosage form earmarked by the earmarking information to be consumed on respective first and second days of the multi-day period, wherein the first pharmaceutical dosage forms contain approximately 2 mg of active ingredient;

two of a second pharmaceutical dosage form earmarked by the earmarking information to be consumed on respective third and fourth days of the multi-day period, wherein the second pharmaceutical dosage forms contain approximately 3 mg of active ingredient;

two of a third pharmaceutical dosage form earmarked by the earmarking information to be consumed on respective fifth and sixth days of the multi-day period, wherein the third pharmaceutical dosage form contains approximately 4 mg of active ingredient;

a fourth pharmaceutical dosage form earmarked by the earmarking information to be consumed on a seventh day of the multi-day period, wherein the fourth pharmaceutical dosage form contains approximately 5 mg of active ingredient;

a fifth pharmaceutical dosage form earmarked by the earmarking information to be consumed on an eighth day of the multi-day period, wherein the fifth pharmaceutical dosage form contains approximately 6 mg of active ingredient;

a sixth pharmaceutical dosage form earmarked by the earmarking information to be consumed on a ninth day of the multi-day period, wherein the sixth pharmaceutical dosage form contains approximately 7 mg of active ingredient;

a seventh pharmaceutical dosage form earmarked by the earmarking information to be consumed on a tenth day of the multi-day period, wherein the seventh pharmaceutical dosage form contains approximately 8 mg of active ingredient;

an eighth pharmaceutical dosage form earmarked by the earmarking information to be consumed on an eleventh day of the multi-day period, wherein the eighth pharmaceutical dosage form contains approximately 9 mg of active ingredient; and three of a ninth pharmaceutical dosage form earmarked by the earmarking information to be consumed on respective twelfth, thirteenth, and fourteenth days of the multi-day period, wherein the ninth pharmaceutical dosage form contains approximately 10 mg of active ingredient.

2. The pharmaceutical dosage system of claim 1, wherein the earmarking information comprises alphanumeric information.

3. The pharmaceutical dosage system of claim 1, wherein the alphanumeric information includes numeric identifiers disposed immediately adjacent corresponding cavities, wherein the numeric identifiers identify a unique day of the multi-day period on which the dosage forms disposed in the corresponding cavities are to be consumed.

4. The pharmaceutical dosage system of claim 1, wherein the earmarking information comprises graphical information.

5. The pharmaceutical dosage system of claim 4, wherein the graphical information comprises arrows disposed immediately adjacent respective cavities that contain respective select dosage forms, wherein the arrows point toward corresponding cavities that contain respective subsequent dosage forms to be consumed on a unique day that is immediately subsequent to the unique day on which the select dosage forms are to be consumed.

6. The pharmaceutical dosage system of claim 4, wherein the graphical information comprises curved surfaces disposed immediately adjacent respective cavities that contain respective select dosage forms, wherein the curved surfaces are curved in a direction toward corresponding cavities that contain respective subsequent dosage forms to be consumed on a unique day that is immediately subsequent to the unique day on which the select dosage forms are to be consumed.

7. The pharmaceutical dosage system of claim 1, wherein the indicia comprise a number that disposed on a first surface of each of the dosage forms that identifies an approximate dosage of active ingredient of the dosage forms.

8. The pharmaceutical dosage system of claim 1, wherein the indicia comprise a color of each of the dosage forms that is unique with respect to one or more others up to all others of the dosage forms.

9. The pharmaceutical dosage system of claim 1, wherein the dosage forms include a first group of the dosage forms that are of a substantially identical first size, and the dosage forms include a second group of the dosage forms that are of a substantially identical second size that is greater than the first size.

10. The pharmaceutical dosage system of claim 9, wherein the indicia comprise a symbol along with an identifier that distinguishes the dosage forms of the second group from the dosage forms of the first group.

11. The pharmaceutical dosage system of claim 1, wherein the active ingredient is designed to treat multiple sclerosis.

12. The pharmaceutical dosage system of claim 1, wherein the pharmaceutical dosage forms are configured as ponesimod dosage forms.

* * * * *